(12) United States Patent
Choe et al.

(10) Patent No.: US 10,108,462 B2
(45) Date of Patent: Oct. 23, 2018

(54) VIRTUALIZING SENSORS

(71) Applicant: Microsoft Technology Licensing, LLC, Redmond, WA (US)

(72) Inventors: Sang Choe, Redmond, WA (US); Sathyanarayanan Karivaradaswamy, Sammamish, WA (US); Mei Wilson, Redmond, WA (US); Fabin Shen, Sammamish, WA (US); Yin Li, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 73 days.

(21) Appl. No.: 15/235,748

(22) Filed: Aug. 12, 2016

(65) Prior Publication Data

US 2017/0235614 A1    Aug. 17, 2017

Related U.S. Application Data

(60) Provisional application No. 62/294,929, filed on Feb. 12, 2016.

(51) Int. Cl.
```
G06F 9/46        (2006.01)
G06F 9/50        (2006.01)
G06F 12/10       (2016.01)
```
(52) U.S. Cl.
CPC .......... *G06F 9/5077* (2013.01); *G06F 9/5016* (2013.01); *G06F 9/5044* (2013.01); *G06F 9/5061* (2013.01); *G06F 12/10* (2013.01); *G06F 2212/65* (2013.01)

(58) Field of Classification Search
None
See application file for complete search history.

(56) References Cited

U.S. PATENT DOCUMENTS

| 6,904,391 B2 | 6/2005 | Merkin et al. |
| 7,020,701 B1 | 3/2006 | Gelvin et al. |
| 7,522,208 B2 * | 4/2009 | Shiohara ............ H04N 5/23293 348/333.06 |

(Continued)

FOREIGN PATENT DOCUMENTS

WO    WO 2002033558    4/2002

OTHER PUBLICATIONS

"International Search Report and Written Opinion Issued in PCT Application No. PCT/US2017/016757", dated Apr. 13, 2017, 17 Pages.

(Continued)

*Primary Examiner* — Adam Lee
(74) *Attorney, Agent, or Firm* — Klarquist Sparkman, LLP

(57) ABSTRACT

Technology related to virtualizing sensors is disclosed. In one example of the disclosed technology, a method can be used to allocate resources of a computing system. The method can include enumerating hardware sensors and software modules that are capable of interacting with one another. A topology can be negotiated that is compatible with capabilities of the enumerated hardware sensors and software modules. A first request can be received from a first requestor to configure at least one of the enumerated hardware sensors and software modules. The at least one of the enumerated hardware sensors and software modules can be configured in response to the received first request.

20 Claims, 8 Drawing Sheets

(56) References Cited

U.S. PATENT DOCUMENTS

| | | | |
|---|---|---|---|
| 8,009,200 B2 | 8/2011 | Goh et al. | |
| 8,014,970 B2 | 9/2011 | Gulati et al. | |
| 8,279,810 B1* | 10/2012 | Li | H04W 4/006 370/328 |
| 8,359,347 B2 | 1/2013 | Branson et al. | |
| 8,812,261 B2 | 8/2014 | Kroupnova et al. | |
| 9,001,227 B2 | 4/2015 | Aleksic et al. | |
| 9,202,357 B2 | 12/2015 | Rehman | |
| 2003/0058345 A1* | 3/2003 | Morris | H04N 5/335 348/207.99 |
| 2003/0063585 A1* | 4/2003 | Younis | G01D 9/005 370/331 |
| 2005/0219391 A1* | 10/2005 | Sun | G06L 5/009 348/255 |
| 2006/0203746 A1* | 9/2006 | Maggenti | H04L 41/0806 370/254 |
| 2007/0126883 A1* | 6/2007 | Ishige | H04N 5/23209 348/211.14 |
| 2010/0146620 A1 | 6/2010 | Simeral et al. | |
| 2010/0220216 A1* | 9/2010 | Fishman | H04N 1/2112 348/231.99 |
| 2011/0282545 A1* | 11/2011 | Karatsinides | B60K 23/00 701/36 |
| 2012/0019643 A1* | 1/2012 | Gideon | H04N 21/25883 348/77 |
| 2012/0044055 A1* | 2/2012 | Kovacic | G06K 19/0717 340/10.1 |
| 2012/0084517 A1 | 4/2012 | Post et al. | |
| 2013/0067136 A1* | 3/2013 | Bates | G06F 12/00 711/103 |
| 2013/0159350 A1 | 6/2013 | Sankar et al. | |
| 2013/0276144 A1* | 10/2013 | Hansen | G06F 21/60 726/29 |
| 2013/0311539 A1 | 11/2013 | Ngai et al. | |
| 2013/0346584 A1 | 12/2013 | Tameshige et al. | |
| 2014/0089527 A1* | 3/2014 | Chandler | G06F 3/00 710/3 |
| 2014/0097966 A1* | 4/2014 | Alexander | G01D 4/002 340/870.02 |
| 2014/0160304 A1* | 6/2014 | Galor | H04N 5/232 348/207.1 |
| 2014/0173595 A1 | 6/2014 | Anand et al. | |
| 2015/0077575 A1 | 3/2015 | Krig | |
| 2015/0092008 A1 | 4/2015 | Manley et al. | |
| 2016/0004575 A1 | 1/2016 | Fink et al. | |
| 2016/0058287 A1* | 3/2016 | Dyell | A61B 5/0024 340/870.07 |
| 2016/0104461 A1* | 4/2016 | Gao | G04G 9/0005 345/545 |
| 2016/0245144 A1* | 8/2016 | Selberg | F01N 9/007 |
| 2016/0378153 A1* | 12/2016 | Kelly | G06F 1/266 710/313 |

OTHER PUBLICATIONS

"Camera profiles", Retrieved on: Feb. 16, 2016, Available at: https://msdn.microsoft.com/en-us/library/windows/apps/mt280221.aspx.

Eyal, et al., "LiMoSense—Live Monitoring in Dynamic Sensor Networks", In Proceedings of 7th International Conference on Algorithms for Sensor Systems, Wireless Ad Hoc Networks and Autonomous Mobile Entities, Sep. 8, 2011, pp. 1-14.

Zacharias, et al., "Technologies and Architectures for Multimedia-Support in Wireless Sensor Networks", In Publication of Intech, Dec. 14, 2010, pp. 373-394.

\* cited by examiner

VIRTUALIZING SENSORS

CROSS-REFERENCE TO RELATED APPLICATIONS

This application claims the benefit of U.S. Provisional Application No. 62/294,929, entitled "REFLECTING MEMORY AND VIRTUALIZING HARDWARE-BASED AND SOFTWARE-BASED SENSORS," filed Feb. 12, 2016, the entire disclosure of which is incorporated herein by reference in its entirety.

BACKGROUND

Operating systems (OSs) of a computer typically do not allow a single hardware device to be shared among multiple applications at the same time. For example, a first application can be selected to consume data (such as frame data) produced by a given hardware device, such as a camera of the computer. Once the first application begins using the camera, no other applications can use the camera at the same time as the first application. However, if the hardware resource can be shared among multiple software applications running on the computer, the computer can have a reduced component count and/or increased functionality.

SUMMARY

Technology related to virtualizing sensors is disclosed. In one example of the disclosed technology, a method can be used to allocate resources of a computing system. The method can include enumerating hardware sensors and software modules that are capable of interacting with one another. A topology can be negotiated that is compatible with capabilities of the enumerated hardware sensors and software modules. A first request can be received from a first requestor to configure at least one of the enumerated hardware sensors and software modules. The at least one of the enumerated hardware sensors and software modules can be configured in response to the received first request.

DETAILED DESCRIPTION

Overview

As described above, an OS of a computing system typically does not allow a single hardware device or sensor to be shared among multiple applications at the same time. Additionally, some applications may use multiple hardware sensors and tightly coupled software modules during execution of the applications. As applications grow more complex, using more hardware resources, it can be desirable for the applications to share hardware resources and to have a unified view of the resources that are present on the computing system.

As described herein, a sensor group can potentially present a unified view of compatible sensors and software modules by virtualizing various hardware and software base "sensors" which produce streams of data. In particular, a sensor group can consolidate various different types of sensors to describe the available streams, their media types, their controls, and any limitations/constraints of those sensors working concurrently. For example, a computing device can include multiple sensor devices and software applications that consume and/or synthesize streaming information similar to a sensor device. The sensor group can virtualize the capabilities of the individual hardware devices and software modules into a single object that can be accessed by one or more software applications. The sensor group can determine which combinations of hardware and software can be used together and can present topologies of compatible combinations to the applications. Thus, the sensor group can provide a framework for sharing multiple hardware devices among multiple software applications in an ala carte manner.

Figure 1:
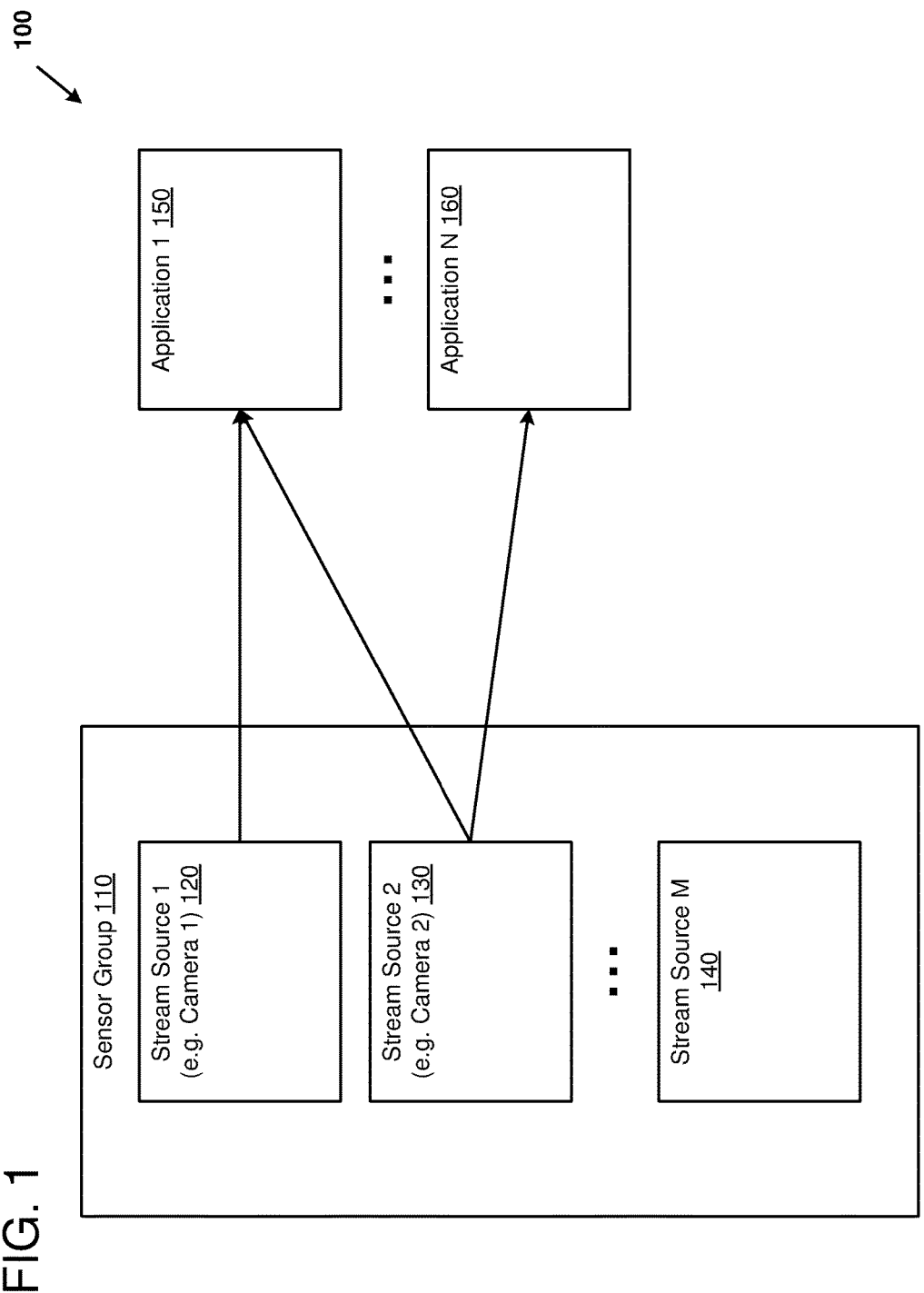
FIG. 1 illustrates an example of multiple applications sharing a virtualized sensor group.

As an illustration, the example system 100 in FIG. 1 can include M "sensors" (such as cameras 120 and 130 and stream source 140) which can be mapped to N applications (such as applications 150 and 160). The sensors 120, 130, and 140 can be virtualized and encapsulated in a sensor group 110. The sensors 120, 130, and 140 generally can produce streaming data and can include hardware sensors, software modules, or combinations thereof. The different applications 150 and 160 can use a consistent API to launch a given sensor from the sensor group 110 and can pick and choose which physical devices and/or software modules within the sensor group 110 to use. For example, the application 150 can use the sensors 120 and 130 and the application 160 can use the sensor 130. Thus, the applications 150 and 160 can share the sensor 130. The sensor group 110 can be used to manage the sharing of the sensor 130 so that the applications 150 and 160 use the sensor 130 in a compatible manner and so that the applications 150 and 160 can communicate with the sensor group 110 rather than with each other. By using the sensor group 110 as a communication point, the applications can be shielded from knowing the requirements of other applications sharing the sensor group 110. In other words, finding compatible configurations of the physical sensors can be delegated to the sensor group 110.

Another potential challenge of a single producer/multi-consumer model for sensor data can be efficient transport of the data from the sensor producers to application consumers. Specifically, it can be desirable to reduce the overhead of creating copies of the data to be marshalled between the producer processes (e.g., the sensors) and the various consumer processes (e.g., the applications). As one example, data can be transferred from a producer process to a consumer process by copying the data from physical memory associated with the producer process to physical memory associated with the consumer process. However, having multiple copies of the data may result in inefficient use of memory resources and inefficient use of computing resources as the copies are being made. For example, making and maintaining multiple copies of the data can reduce performance (as computing cycles are devoted to copying data), decrease memory efficiency (as multiple copies of the same data can prevent other applications from using the memory resources), and decrease battery life (as energy is used for the copying and refreshing of the memory resources).

"Shared memory" is one solution that can be used to send data across process boundaries. Shared memory may reduce the overhead of making multiple copies of the data, but the producer can lose access control of the data once it has been sent to the consumer process. For example, the OS can allocate a shared memory object that can be accessed by the producer and consumer processes. In particular, the producer process and consumer process can agree on using a shared memory object by using an out of band communication (such as an RPC call). The shared memory object can be created by using system APIs of the OS. Specifically, the producer process can create the shared memory object and map it into its address space. The consumer process can repeat the process so that the same physical address range has two different mappings into the virtual address spaces of the two different respective processes. Thus, the physical address range is shared between the different processes.

While using a shared memory object accomplishes the goal of allowing two processes to share the same physical memory, the producer loses access control of the data. This is because the ownership of the shared memory object is no longer limited to the producer process. Instead, because both process used the system API to create the shared memory object, it is jointly owned by both processes (in the case of multiple consumers, each consumer process would share ownership of the shared memory object). As long as the consumer process holds on to the mapping, the shared memory object cannot be removed and the memory cannot be deallocated. In other words, the producer process has no way to revoke access from the consumer process for the shared memory object. This can create a potential security and privacy vulnerability as the consumer process can continue to read the memory even if the producer desires to revoke read privileges.

As disclosed herein, kernel memory reflection can potentially reduce or eliminate copying and enable the producer process to maintain access control. For example, instead of the producer/consumer processes mapping the memory into their process spaces, the kernel component (herein referred to as a reflector) can handle the mapping and lifetime of the memory. This can be accomplished by the producer process providing to the reflector a list of virtual addresses specific to the producer process along with their sizes and the list of consumer processes that may consume the data. Since the producer provides the list of allowed consumers of the data, the reflector can use the producer-provided list to ensure any non-approved consumers are not allowed to access the reflected frames.

Example Sensor Group Architectures

Figure 2:
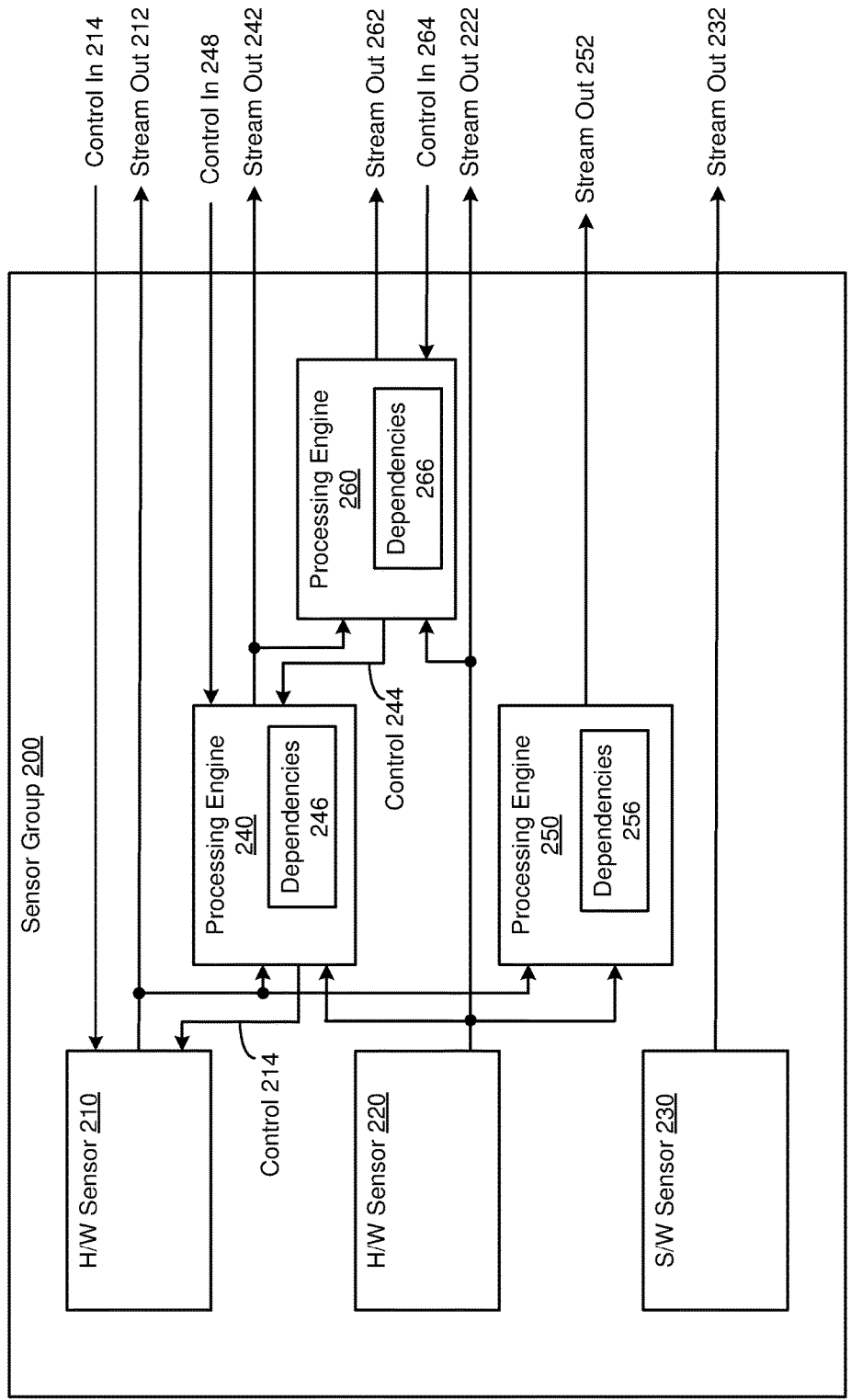
FIG. 2 illustrates aspects of an example virtualized sensor group.

FIG. 2 illustrates aspects of an example sensor group 200. The sensor group 200 can be a software object or data structure identifying hardware sensors and associated software modules that can be used together or separately. In particular, the sensor group 200 can consolidate various different types of hardware sensors and/or software modules to describe the available streams, their media types, their controls, and any limitations/constraints of those sensors working concurrently. The sensor group 200 can present or publish which combinations of hardware sensors and/or software modules can be used together and can present topologies of compatible combinations to applications. The sensor group 200 can include hardware sensors, software sensors, and processing engines.

A hardware sensor, such as sensors 210 and 220, can include hardware that provides a computer system with information about the computer system and/or its environment. For example, hardware sensors can include sensors used to detect light or images (such as visible, infrared, and/or ultraviolet cameras), temperature, force (such as a tactile sensor), chemicals, humidity, location (such as by using global positioning system (GPS) signals or radio triangulation), orientation (such as a gyroscope), acceleration, and other various environmental qualities. The sensor can be connected to or enclosed within a chassis of the computer system or the sensor can be connected via an expansion port or cable connector (such as Universal Serial Bus (USB)), for example. The hardware sensor can produce an output such as a streaming output (herein referred to as a source stream) that is representative of the qualities being measured. The hardware sensor can include controls that can change modes of the hardware sensor and/or affect various qualities of the measurement. As one example, the hardware sensor may support multiple different modes or transfer rates that are mutually exclusive at a given point in time, and the controls can be used to set the mode of the hardware sensor. As another example, the controls can be used to change a setting that affect the streaming output (such as a focus control on a camera). The hardware sensor can communicate with an operating system of the computer system using software, such as a device driver.

As a specific example, a hardware sensor can be a camera mounted on a chassis of the computing system. The camera can produce a stream of video data, such as red-green-blue (RGB) data representing the visible spectrum view of the world. The camera can be configured so that the video data can be produced by the camera, captured using the operating system, and delivered to applications that can consume the camera data. The camera can have controls that can be adjusted to start, stop, or vary the video output. For example, the video output can be varied by changing a transfer rate, media type, focus, exposure, white balance, and so forth.

A processing engine (such as processing engines 240, 250, ad 260) is a software module that accepts an input, processes the input, and generates an output (such as a synthesized stream). Processing engines can perform various different functions such as compression, rotation, depth analysis, transcoding, motion tracking, image recognition, or other functions. The processing engines can accept inputs from the hardware sensors and/or from other processing engines. As specific examples, the processing engines 240 and 250 can each accept inputs from the hardware sensors 210 and 220, and the processing engine 260 can accept inputs from the hardware sensor 220 and the processing engine 240. The processing engines can have various requirements in order to function correctly. For example, a processing engine may specify one or more dependent streams having a minimum transfer rate, a maximum transfer rate, one or a set of compatible media types, and so forth. If the input requirements of the processing engine are not met, the processing engine cannot be used.

As a specific example, the hardware sensors 210 and 220 can be cameras capable of producing video formats of 720p, 1080p, 1080i, or 4K. The processing engine 240 can be capable of generating a depth stream 242, but only when the inputs 212 and 222 from a pair of cameras (e.g., hardware sensors 210 and 220) mounted on the same chassis are each generating video using the 720p video format. The cameras can provide a stereoscopic view of the environment. The processing engine 240 can synthesize the two RGB streams 212 and 222 from the cameras and produce a single depth stream 242 providing a depth map of the view. In this example, the depth stream 242 created in this manner is a synthesized stream and the two RGB source streams 212 and 222 consumed by the processing engine 240 are dependent streams. So long as the dependent streams are operated at 720p, the processing engine 240 can generate the depth map. However, if another application configures one or both of the hardware sensors 210 and 220 at 1080p, then the processing engine 240 cannot be used concurrently with the other application using the sensors at 1080p.

Controls can be used to set the mode of a hardware sensor or processing engine and/or affect the operation of the hardware sensor or processing engine. For example, the controls can be used to initialize a sensor or engine, start or stop a data stream, change parameters affecting the data, and so forth. As an example of video controls, the controls can be adjusted to begin a video stream, end a video stream, vary the video output, such as a transfer rate, media type, focus, exposure, white balance, and so forth. The controls can be cascaded so that a control action sent to a processing engine can be fed through to a sensor generating a dependent stream of the processing engine. As a specific example, a control input 264 to the processing engine 260 can be fed through the processing engine 240 via control 244 to the hardware sensor 210 via control 214. In this manner, an application can interface with only the processing engines (e.g., processing engine 260) without also having to interface directly with the hardware engines (e.g., hardware sensor 210).

Dependencies of the processing engines can be maintained in a dependency data structure (e.g., dependencies 246, 256, 266) of the processing engines. For example, the dependency data structure can be used to list or track dependent streams, any requirements of the dependent streams, control interfaces of upstream sensors or processing engines, and any other requirements of the processing engine. As a specific example, the dependencies 246 for the processing engine 240 (e.g., the depth stream component) can include the dependent streams (e.g., a stream from a left RGB camera, such as stream 212, and a stream from a right RGB camera, such as stream 222), the transfer rate(s) and/or media type(s) required of the streams (e.g., 720p), and the control interface to the hardware sensors (e.g., control 214). As described further below, the dependency data structure can be used when generating topologies of the sensor group.

The sensor group 200 can present or publish one or more topologies that are legal or compatible at a given point in time. A topology includes a compatible combination of resources (sensors and/or processing engines), their settings, and their connections that can be used concurrently. Multiple topologies may be possible at a given point in time. As one example, a first topology can include only the hardware sensor 210 operating at a maximum data transfer rate. From the example above, the hardware sensor 210 can be a camera operating at 4K. As another example, a second topology can include the hardware sensors 210 and 220 and the processing engine 240 interconnected and configured with settings that enable the resources to interoperate. From the example above, the hardware sensors 210 and 220 can be camera operating at 720p, the processing engine 240 can be a depth stream engine, and the sensors 210 and 220 can be interconnected with the engine 240 so that a depth map 242 is generated. The first topology and the second topology are incompatible because both cannot operate concurrently. However, both topologies are possible before any of the resources of the sensor group 200 are configured. The sensor group 200 can be used to manage the settings and connectivity of the resources within the sensor group 200. Thus, the sensor group 200 can initially publish both of the topologies before configuration, and then dynamically adjust the topologies (e.g., present a smaller subset of compatible topologies) that are presented as the different resources are configured.

A relative positional relationship of different resources of the sensor group 200 can be indicated by referring to a resource as upstream or downstream of another resource. The most upstream resources are resources that generate source streams. A resource that uses a source stream is downstream from the resource that generates the source stream. The resource generating the source stream is upstream of the resource that uses the source stream. In general, a source that is farther from the source stream is more downstream than a device that is closer to the source stream. As a specific example, the processing engine 260 is downstream from the processing engine 240 which is downstream from the hardware sensor 210.

Processing engines can also be hybrid modules using software- and hardware-based components. A distinguishing factor that can be used to classify a processing engine is that the processing engine accepts a stream input. For example, a video encoder can be a software-based component that is accelerated by hardware. As one example of a video encoder, the video encoder can include a hardware accelerator that receives an unencoded video stream (such as from a camera) and outputs an encoded video stream (such as MPEG4 or H.264 video). The video encoder can be classified as a processing engine, even though it uses hardware, because the encoder receives a streaming input.

A software sensor, such as software sensor 230, can include software routines for generating streaming data. Specifically, the software sensor 230 can generate a stream of data without consuming any source streams from hardware sensors or synthesized streams from processing engines. The software sensor 230 can be a custom source which can generate or pull data from non-sensor sources, such as by pulling information from a network, reading from a file, or generating data from a software routine or algorithm.

Figure 3:
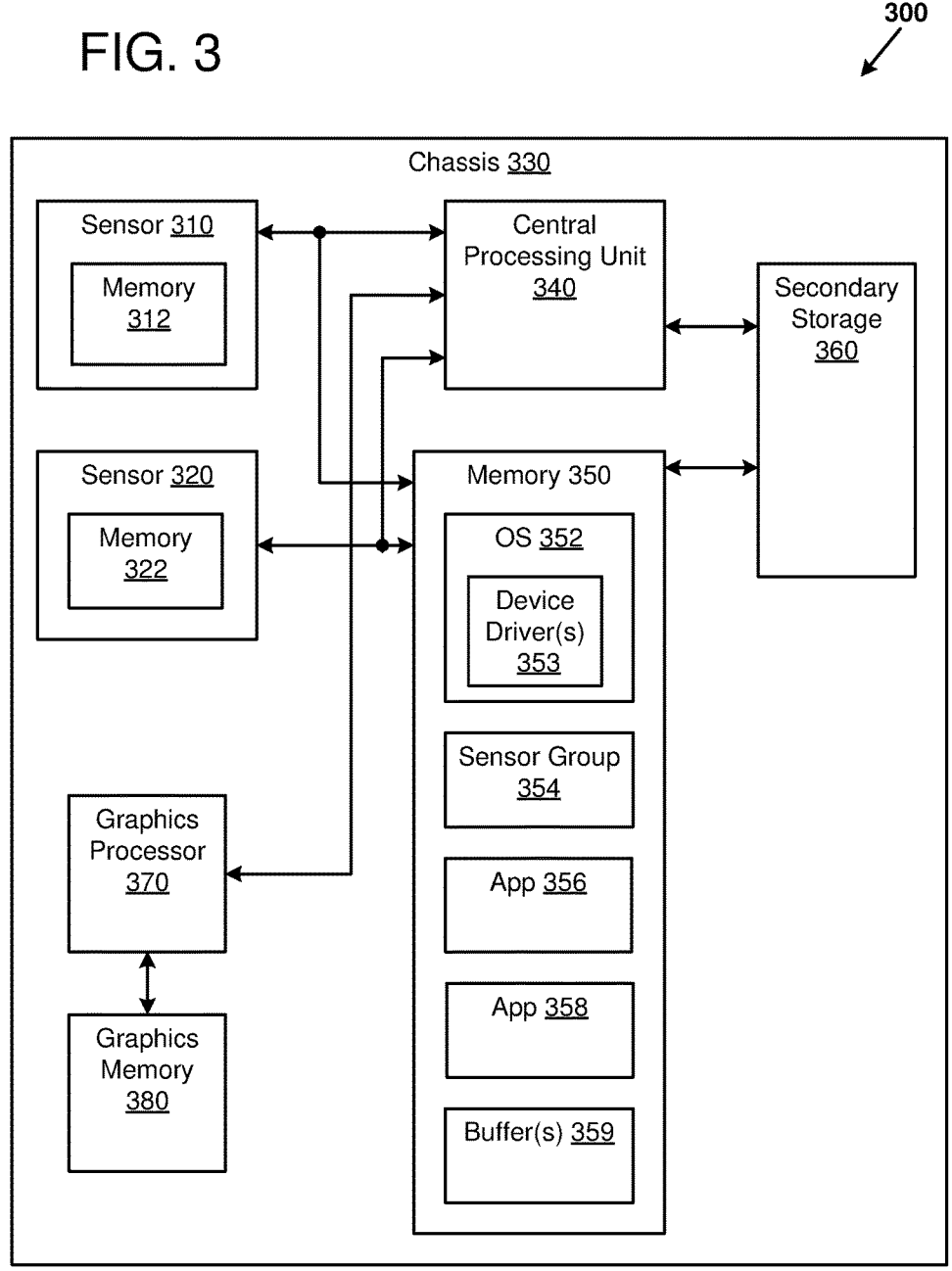
FIG. 3 is a system diagram of an example computer system including multiple sensors and distributed memory.

FIG. 3 is a system diagram of an example computer system 300. The computer system 300 can include various hardware components, such as multiple sensors (such as sensors 310 and 320), distributed memory (312, 322, 350, and 380), a central processing unit (CPU) 340, a graphics processing unit (GPU) 370, and secondary storage 360 (such as a hard disk drive). The hardware components can be connected to and/or enclosed by a chassis 330. As one example, the sensor 310 can be a left camera mounted on the chassis 330 and the sensor 320 can be a right camera mounted on the chassis 330. As another example, the sensor 310 can be a front camera mounted on the chassis 330 and the sensor 320 can be a rear camera mounted on the chassis 330. The sensors 310 and 320 can include embedded memory 312 and 322 that is closely coupled to the sensors 310 and 320, respectively. For example, the embedded memory 312 and 322 can be used to store image, video, or other streaming data.

The CPU 340 can communicate directly with the hardware components of the computer system or via chipset logic and/or bridges (not shown) of the computer system 300. The CPU 340 can execute programs that are loaded into system memory 350. For example, the CPU 340 can execute an operating system (OS) 352 that can be used to manage the resources of the computer system 300. In particular, the OS 352 can be used to manage input/output devices and co-processors (such as by initializing and controlling the sensors 310, 320 and the GPU 370 using device driver(s) 353 and/or other routines), manage both virtual and physical memory (such as by loading programs into the memory from the secondary storage 360 and managing data transfers between the programs and the sensors 310, 320 and the GPU 370), manage processes and/or threads of the programs, manage the use of storage (such as the secondary storage 360), and provide other system services for programs and devices. A process is a program or software routine in execution. Each process can include a memory space, registers, a program counter, a process identifier, program code, a stack, a heap, a data section, a process state, and other accounting information for the process. Each process can include one or more threads of execution, where each thread shares the memory space with the other threads of the process, and each thread can have a dedicated thread identifier, program counter, stack, and register set. The CPU 340 can execute different processes and/or threads using a time-shared mode and/or concurrently.

The physical system memory 350 includes volatile and/or non-volatile computer-readable storage (such as random access memory (RAM), read-only memory (ROM), and Flash memory) that is addressable by the CPU 340. The physical system memory 350 includes a finite number of storage locations that can be accessed using a different address for each location. The OS 352 can allocate and address more memory locations than are available in the physical memory 350. In particular, the OS 352 can allocate and manage virtual memory having an address range that exceeds the physical address range of the physical memory 350. As one example, the OS 352 can allocate a separate virtual memory space for each process or application so that multiple virtual address spaces can be active concurrently. The virtual addresses can be mapped to physical addresses using memory management software of the OS 352 and memory management hardware of the CPU 340 (such as a translation lookaside buffer (TLB)). Specifically, the virtual memory addresses can be divided into pages, and commonly used pages can be stored in the physical memory 350 (the active or resident pages), and less commonly used pages can be stored in the secondary storage 360 (the inactive or non-resident pages). The secondary storage 360 can have a slower access time than the system memory 350, so by keeping the more commonly accessed pages in system memory 350, the memory access time can be reduced and the performance of the system 300 can be increased.

The system memory 350 can be used to store all or portions of programs (e.g., software code, routines, modules, engines, or instructions) that can be executed by the CPU 340, data structures, variables, data buffers, and other information. As illustrated, the memory 350 is loaded with the OS 352, a sensor group object 354, applications 356 and 358, and data buffer(s) 359. The sensor group 354 can be used to identify and manage the hardware sensors 310 and 320 and any processing engines or software sensors. For example, the sensor group 354 can identify all of the sensors and their associated processing engines that are available within the chassis 330. The applications 356 and 358 can be general purpose applications capable of being executed by the CPU 340. As described in more detail further below, the applications 356 and 358 can include producer applications generating streaming data, consumer applications receiving or consuming streaming data, controlling applications which can control the initialization and/or operation of the sensors 310 and 320 and block other applications from controlling the sensors 310 and 320, and/or sharing applications which can initialize and/or use the sensors 310 and 320 but can be blocked by controlling applications. The buffer(s) 359 can be used by the applications 356, 358, and the sensors 310 and 320 for transporting data. Additionally or alternatively, transport buffers can reside in the embedded memory 312 and 322 of the sensors 310 and 320, respectively, and in graphics memory 380 associated with the GPU 370.

Figure 4:
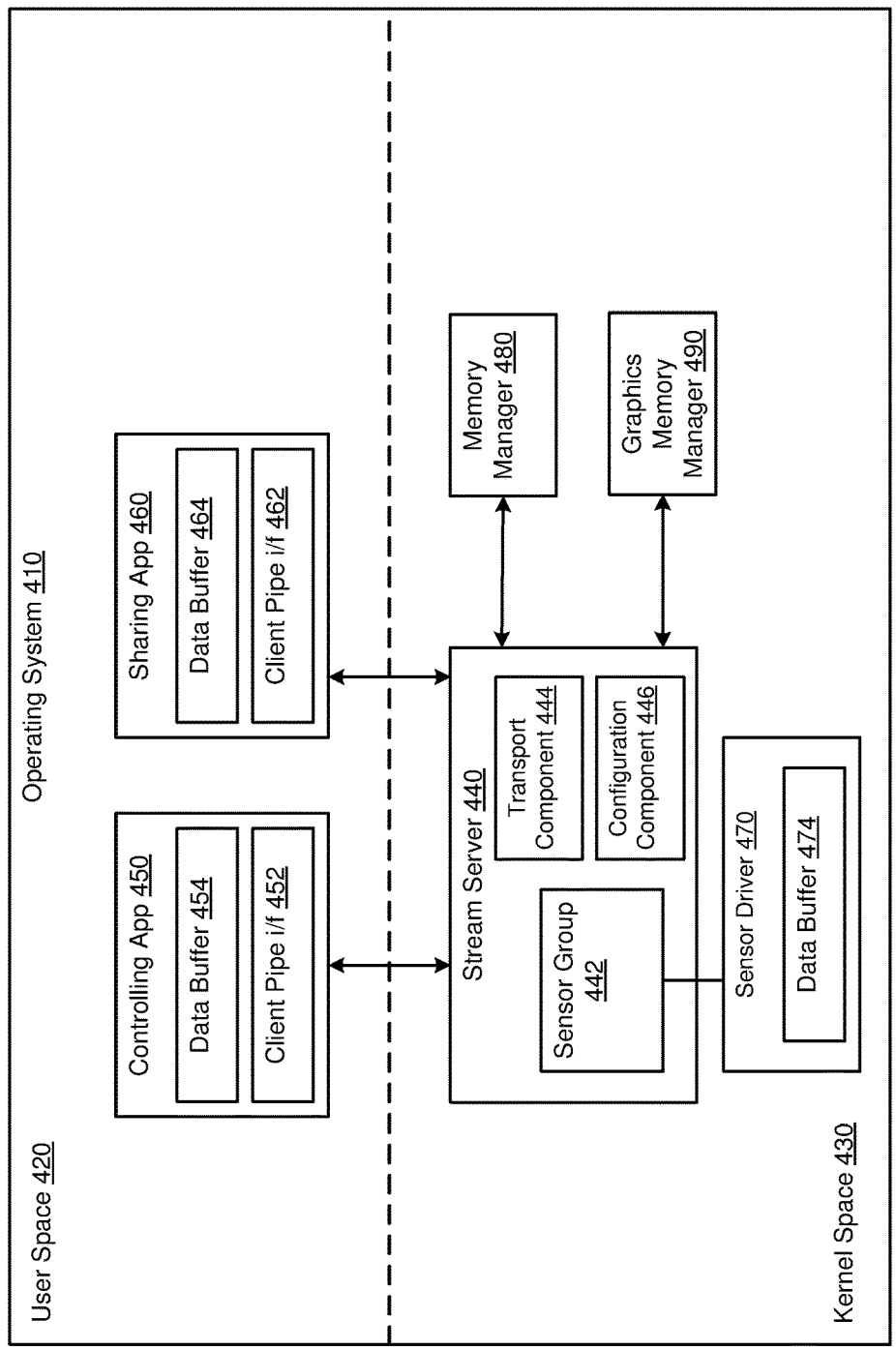
FIG. 4 is a system diagram of an example software architecture for using a virtualized sensor group.

FIG. 4 is a system diagram of an example software architecture 400 for using a sensor group 442. An operating system 410 can manage the execution of application programs, manage the exchange of information among the application programs, and provide services for the application programs, such as by providing an interface to hardware sensors. The OS 410 can also use the sensor group 442 to discover and configure resources of the sensor group 442, and to manage transport of data from the resources of the sensor group 442 to the application programs.

The OS 410 can divide the memory into different spaces corresponding to different privilege levels, where higher privileged processes have more access to memory and services and lower privileged processes have less access to memory and services. For example, the OS 410 can divide the memory into a user space 420 and a kernel space 430. Applications (such as the applications 450 and 460) and lower privileged software routines can operate in the user space 420 and higher privileged services of the OS 410 can operate in the kernel space 430. Separating the memory into the user space 420 and the kernel space 430 can increase security, privacy, and fault tolerance of the OS 410 by limiting memory access of potentially faulty or malicious applications.

The OS 410 can include different software routines, modules, or components for managing different aspects of the execution of programs. For example, the OS 410 can include a stream server 440 for managing streaming data, a memory manager 480 for managing virtual and physical memory, a graphics memory manager 490 for managing graphics memory, and a sensor driver 470 for initializing and managing a hardware sensor. For example, the memory manager can be used to create a virtual memory space for a new process or application when the process is started, to allocate the virtual memory for various purposes, and to map virtual addresses to physical addresses and/or locations in secondary storage. The memory manager can track the virtual to physical mappings using page tables. The memory manager typically only uses physical memory that is located within the system memory that is closely coupled to a CPU. The graphics memory manager 490 is similar to the memory manager 480, except that the graphics memory manager 490 is used with graphics memory that is closely coupled to a GPU. Thus, the graphics memory manager 490 and the memory manager 480 operate on different non-overlapping portions of physical memory.

The sensor driver 470 can be used by the OS 410 to communicate with a hardware sensor. For ease of illustration, a single sensor driver 470 is shown, but there can be multiple sensor drivers, such as a sensor driver for each type of sensor of the computer system. The sensor driver 470 can be used to initialize and/or update registers of the sensors so that the sensor can be controlled. The sensor driver 470 can be used to read the registers of the sensor so that the OS 410 is aware of when data is available from the sensor. The sensor can also have embedded memory within the sensor for storing data collected by the sensor, and the sensor driver 470 can be used to manage the transport of the data from the embedded physical memory to the OS 410.

The stream server 440 can use the sensor group 442 to manage the configuration of the sensors and the transport of data from the sensors. For example, the stream server 440 can include a transport component 444 for managing data transport and a configuration component 446 for managing configuration of the sensors. Alternatively, the transport component 444 and the configuration component 446 can be integrated into to the sensor group 442. For example, the transport component 444 and the configuration component 446 can be methods of the sensor group object 442.

The configuration component 446 can manage different levels of access and control to the resources (e.g., sensors or devices or processing engines) within a sensor group 442. For example, an application can request different types of access for the resources of the sensor group and the sensor group may allow or deny the particular type of access. Access types or modes can include controlling access and sharing access. For example, an application can request to use a given device within the sensor group in controlling mode. If the application is granted controlling mode access then the application has control over the configuration of the device, within the capabilities allowed by the sensor group. Once the application is granted controlling mode access, other applications cannot change the configuration of the device. Thus, some potential topologies within the sensor group may be unreachable once controlling mode access is granted for a device. For example, if a first application gets controlling mode access to the right camera and is granted a 4K bit rate, then later applications will not be able to use the depth component since the output rate of the right camera cannot be reduced to 720p. By granting the controlling mode access, a reduction in bit rate for the right camera is prevented. Controlling mode access can be granted on a first-come first-served algorithm where only one requestor can be the controller during a given time period. Additionally or alternatively, controlling mode access can be granted using a different scheme, such as by giving applications different priority or privilege levels, and allowing higher privileged applications to take control from lower privileged applications.

The controlling mode access can affect upstream devices in the sensor group 442. For example, a dependency tree can be built starting from the controlling device, and all devices associated with the dependent streams can also be locked in controlling mode. For example, a first application can request to use the depth component in controlling mode. The request may be granted if there is not already a controlling application for all of the depth component, the left camera, and the right camera. If any of the components are already locked in controlling mode by a different application the request will be denied. However, if all of the components are not locked in controlling mode yet, the request can be granted and the first application can lock all of the components in controlling mode. The topologies published by the sensor group 442 can be updated to reflect that some of the topologies may no longer be available due to the control mode access being granted.

If the application is granted sharing mode access then other applications may have control over the configuration of the device, within the capabilities or topologies allowed by the sensor group. Thus, if the first application gets sharing mode access to the right camera and is granted a 4K bit rate, then later applications may be able to use the depth component by downgrading the output rate of the right camera to 720p. As another example, if the first application gets sharing mode access to the right camera and is granted a 720p bit rate, then a later application getting controlling mode access may increase the right camera to 1080p. The first application can be notified of the transition and receive a message that the stream was lost. The first application can potentially still use the right camera if it rejoins the stream by requesting the higher 1080p bit rate.

The configuration component 446 can also be used to create a buffer (e.g., data buffers 454, 464, and 474) for transporting data from a sensor to an application. For example, when the sensor is used for the first time, a process (a producer process) and a virtual memory space can created for the sensor. The producer process can be used to produce and manage data transfer from the sensor and can include software routines of the sensor driver 470. An application that is using the sensor data can be running in a different process (a consumer process). The producer process can be created as part of an initialization sequence of a computer, when the application requests to use the sensor, or in response to launching an application associated with the sensor, for example. Physical memory can be allocated for the data buffer associated with the sensor. In particular, the data buffer can be allocated in a virtual address range of the producer process and physical memory can be mapped to the virtual address range. For example, the memory can be allocated by calling a service of the memory manager 480, the graphics memory manager 490, and/or the sensor driver 470. Thus, the physical memory can be system memory which is closely coupled with the CPU, graphics memory which is closely coupled with the GPU, and/or embedded sensor memory which is closely coupled with the sensor. An address from within each page can be read (or probed) and locked in the physical memory. Locking the memory includes keeping the pages of the data buffer resident in physical memory so that the pages are not paged out to secondary storage. The physical memory can be shared with the calling or consuming application by assigning the physical memory pages to virtual addresses of the consuming process. Thus, different virtual addresses can map to the same physical address. The mappings of the producer virtual addresses, the consumer virtual addresses, and the physical addresses can be kept in a memory descriptor list or other data structure. A memory descriptor list can be an array or linked list of valid memory locations.

The configuration component 446 can also be used to load a library routine (e.g., client pipe interfaces 452 and 462) into the virtual memory of the calling application to aid with data transport from the sensor to the application. For example, the library routine can act as interface between the application and the sensor. In particular, the library routine can be used to access services, information, and/or methods of the sensor group 442 and/or the stream server 440.

The transport component 444 can be used to manage data transfers from the sensor to the applications. For example, the data buffer can be arranged as a circular first-in first-out (FIFO) buffer having a head pointing to the oldest information and tail pointing to the newest information. The producer process can add information to the buffer by pushing data into the tail of the buffer and the consumer process can take information from the buffer by pulling data from the head of the buffer. The buffer is circular, so storage locations can be reused after the data in the storage locations has been consumed. Multiple consumer processes can pull from the buffer, so a storage location may not be recycled until all of the consumer processes have pulled data from the location. If the transfer rate into the buffer is greater than the transfer rate out of the buffer, the buffer can become full. The transport component 444 can support either a lossy or a lossless approach for the buffer. If the buffer is configured to be lossless, new data from the producer process can be stalled or dropped when the buffer is full. If the buffer is lossy, new data from the producer process can overwrite the oldest data that is not currently being read from the buffer. The order and location of the data within the buffer can be tracked with a memory descriptor list that points to each chunk of data within the buffer. The transport component 444 can indicate to the applications that data is available in the buffer by sending a message to the library routine (e.g., the client pipe interfaces 452, 462) or by responding to a request from the library routine. For example, the transport component 444 can provide a pointer to the head of the buffer (as determined from the memory descriptor list) to the application when data is available.

To summarize some of the concepts from above, the example of FIG. 4 illustrates that the OS 410 can be executing two separate applications, a controlling application 450 and a sharing application 460. Each of the applications 450 and 460 can be a separate process allocated its own virtual memory space. The sensor driver 470 can be running in a third virtual memory space. As one example, the controlling application can send a request to the stream server 440 to use one or more sensors identified by the sensor group 442. The request can cause the configuration component 446 to create a process for the sensor driver 470, load the client pipe interface 452, and create the buffers 474 and 454. The buffers 474 and 454 are in different virtual memory spaces, but can refer to the same physical memory, which can be system memory, graphics memory, and/or embedded system memory. The sensor driver 470 can manage filling of the data buffer 474 and notify the transport component 444 when new data is available. The transport component 444 can communicate with the client pipe interface 452 so that the data in the data buffers 454 can be accessed. It should be noted that the application 450 can access and process the data without copying the data to another physical memory location because the data is directly mapped into the virtual address space of the application and the data is resident in the physical memory (by locking the memory locations corresponding to the data buffer). In this manner, the "transfer" of data from the sensor to the application 450 can be accessed in a reduced amount of time and with fewer memory resources than if the data were copied from one range in physical memory to another range in physical memory. As the data is being transported, the sharing application can send a request to the stream server 440 to use the same stream output as the controlling application 450 is using. The streaming output can be identified by the sensor group 442. Since the sensor driver 470 is already running, and the buffer 454 is already allocated, the request can cause the configuration component 446 to load the client pipe interface 462, and create the buffer 464 (e.g., find free virtual memory address locations and map them to the physical memory corresponding to buffer 474). Thus, the buffers 474, 464, and 454 can all be in different virtual memory spaces, but can refer to the same physical memory.

It should be noted that for ease of illustration, the description above describes only one division of functionality between the user space 420 and the kernel space 430. However, other divisions are possible. As one example, the sensor group object 442 can be assigned to either the user space 420 or the kernel space 430. Also, the description above describes only one organization of the software functions of the OS 410. For example, the sensor group object 442 can be part of the stream server 440, or the sensor group object 442 can be separate from, but in communication with, the stream server 440.

Example Sensor Group Methods

Figure 5:
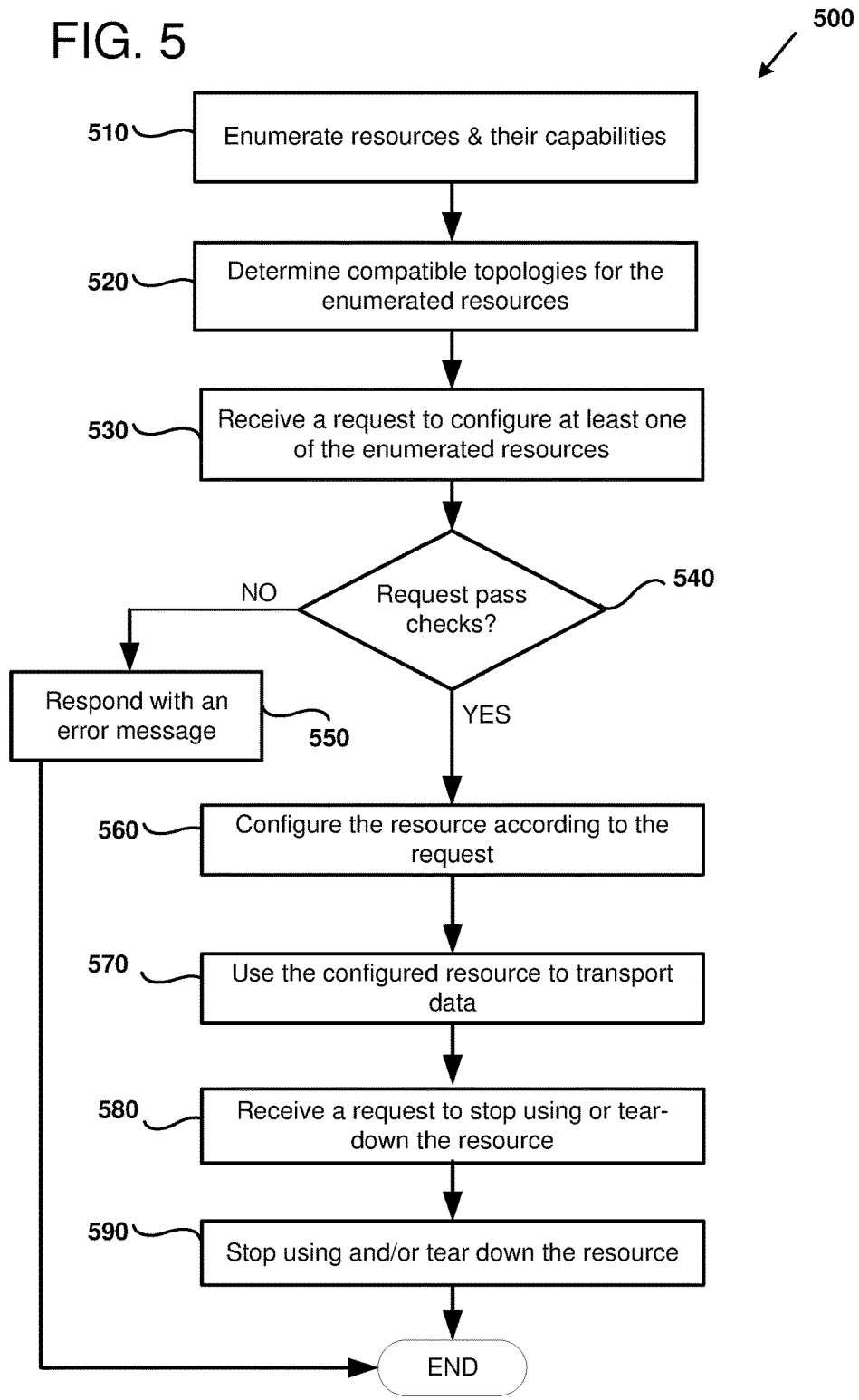
FIGS. 5-7 illustrate example methods of using virtualized sensor groups.
Figure 6:
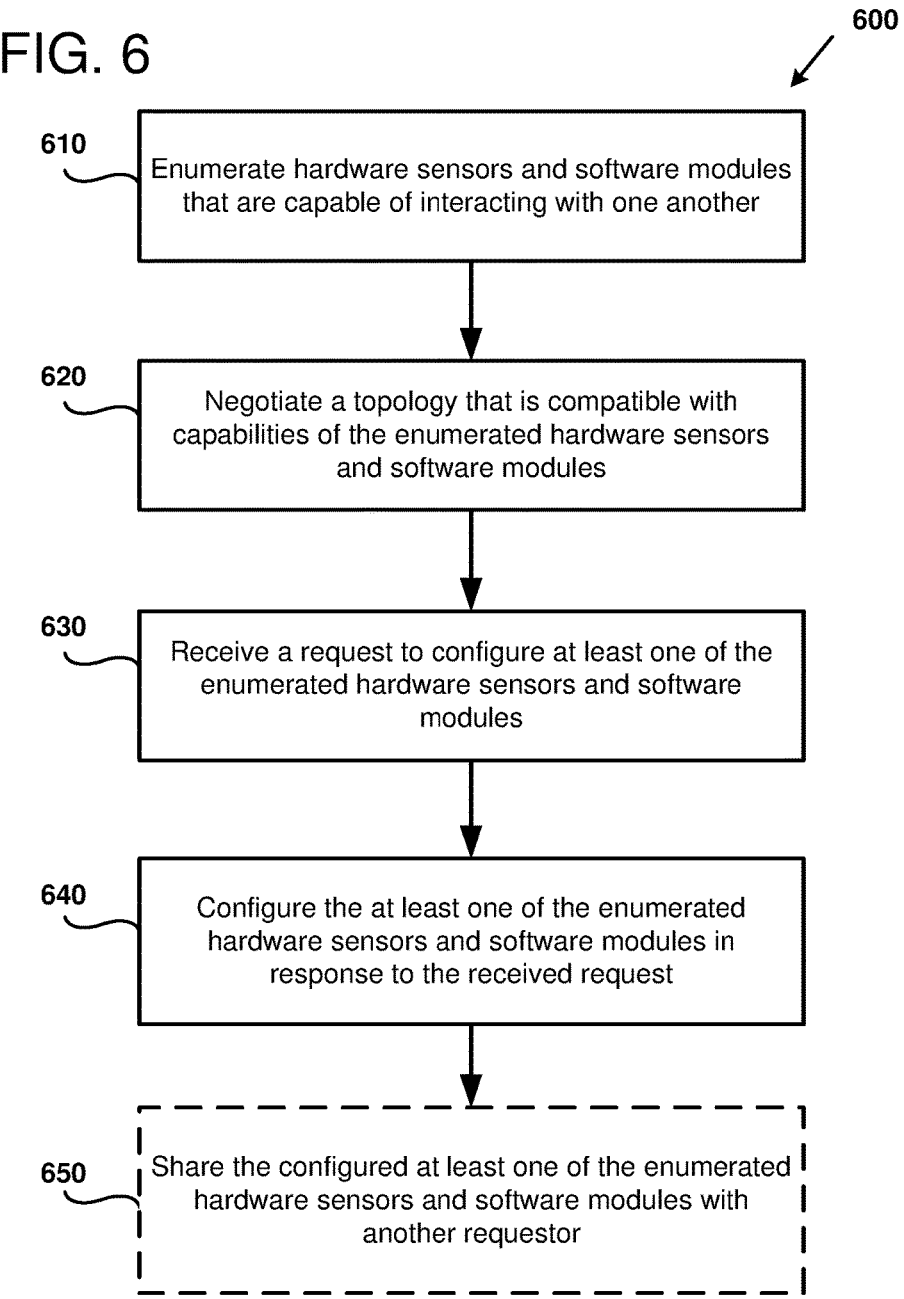
Figure 7:
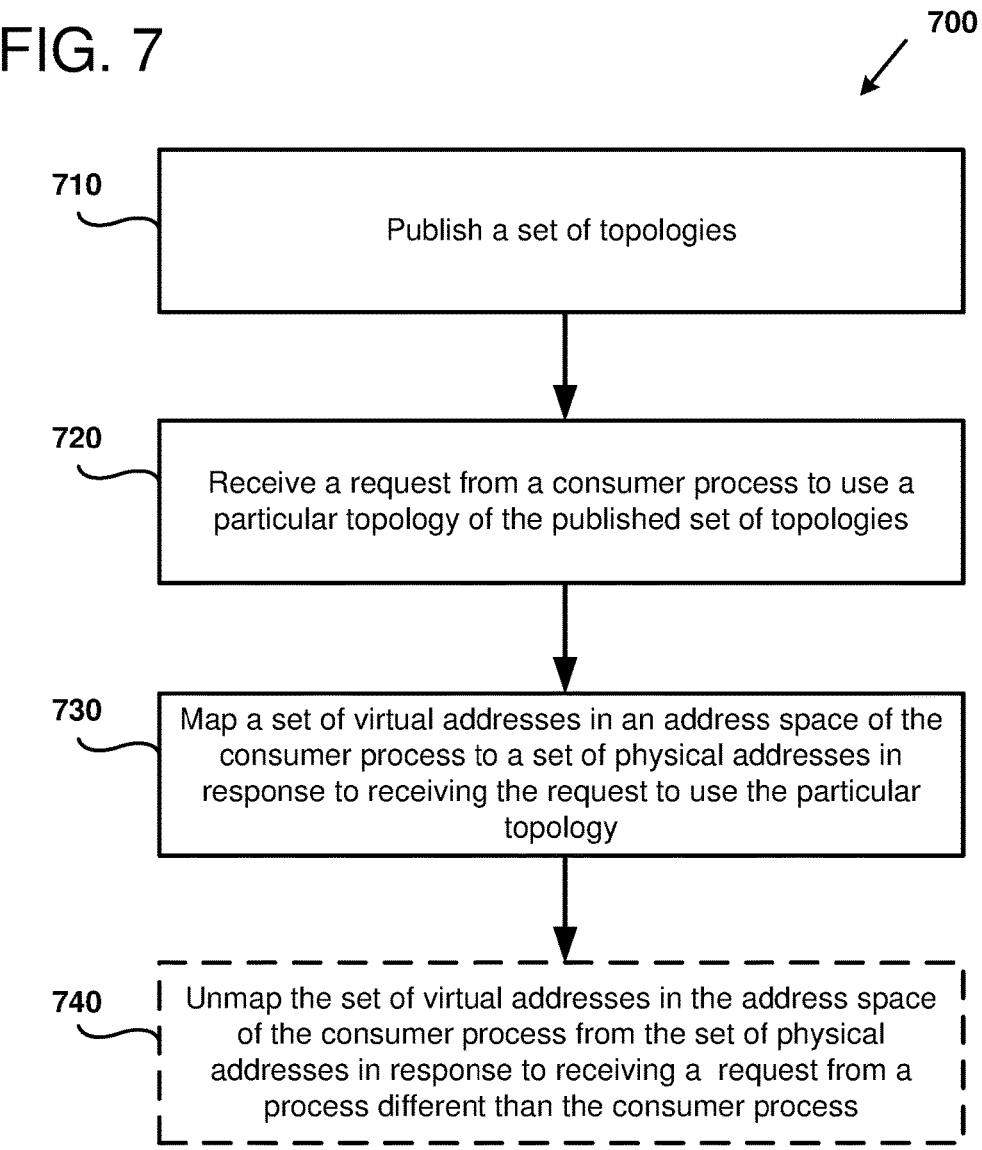

FIGS. 5-7 illustrate example methods of using virtualized sensor groups. FIG. 5 is a flow diagram illustrating an example method 500 of managing resources associated with a sensor group. At 510, resources that are capable of being grouped in a sensor group are identified or enumerated to create a membership of the sensor group. For example, the resources can include hardware sensors, software sensors, and processing engines. The capabilities of the resources can also be enumerated. For example, each resource can include a set of capabilities that can be utilized concurrently or mutually exclusive of other capabilities. As one example, the individual sensors of the sensor group can operate at varying levels of performance based on connections to the processing engines or based on input from controls.

In one embodiment, the membership within a sensor group can be defined based on hardware sensors associated with a given container identifier, profile information available for the respective sensors, and installed software components. As one example, the sensor group can include hardware sensors having a matching container identifier. A container identifier can be used to identify a particular physical chassis on which hardware sensors are mounted. For example, multiple cameras built into a laptop can share the same container identifier because the laptop represents the physical chassis. Multi-camera devices that are plugged into a laptop (such as via a USB port) can have a common container identifier across those cameras, but can have a different container identifier than the built-in cameras since the physical chassis of the multi-camera device can be the physical container that is being plugged into the laptop. The container identifier can be stored in a register or memory of the hardware sensor. For example, the container identifier can be stored in a flash memory or read-only memory of the hardware sensor. Additionally or alternatively, the container identifier can be stored in a driver or other software associated with the hardware sensor.

As another example, specific profile information may be required for a given sensor to be bundled within a sensor group. For example, the profile information may be stored in a device driver or a predefined file type associated with the given sensor. The profile information can be stored or installed on the computing device when the given sensor is added to the computing device. For example, a camera sensor may be described in a camera profile and/or a concurrent camera profile. The camera profile and the concurrent camera profile can be installed when the camera sensor is added to the computer, for example. The profiles can be used to describe which capabilities are supported by the sensor and/or which sensors can work together. For example, cameras can support different capabilities including a set of supported capture resolutions, frame rate for video captures, and whether high-dynamic-range imaging (HDR) or variable frame rate captures are supported. The set of capabilities can be captured in a predefined data structure, such as defined by the Universal Windows Platform (UWP) media capture framework. For example, a camera profile can be represented by a software object having three collections of media descriptions: one for photo capture, one for video capture, and another for video preview. As another example, a concurrent camera profile can specify a relative orientation of cameras, such as a left camera, a right camera, a front camera, or a rear camera. The concurrent camera profile can specify limitations of using cameras together, such as if there is a shared hardware component (such as a frame buffer). The concurrent camera profile can specify additional information about the camera, such as performance characteristics of the camera as a function of temperature, orientation, and so forth.

As another example, any pre-installed software components can be added to the sensor group. For example, by default, processing engines and software sensors can belong to all container identifiers and have common concurrent camera profiles with all hardware sensors. Additionally, software components can be added to the sensor group when new software is installed on the computer. For example, the software installation can trigger an enumeration of the sensor group.

The enumeration can occur during a boot-up sequence of the computing device and/or when a process associated with the sensor group wakes up. For example, the devices can be searched for in a database (such as a registry or a device interface node) used to store the device keys or software keys corresponding to devices and software of the computing device. If there are new devices or if previously installed devices are not found, the enumeration and topology negotiation of the sensor group can be initiated. After enumeration, the list of devices and processing units can be hashed and the hash result can be stored. During the next enumeration, the list of devices and processing units can be hashed and the hash result can be compared to the stored hash result. If the hash results are different (indicating the set of devices has changed), topology negotiation can be initiated. However, if the hash results are the same (indicating the set of devices has not changed), topology negotiation can be skipped.

At 520, compatible topologies for the enumerated resources can be determined, such as by performing a topology negotiation. A single topology can represent one way that the resources can be connected and configured within the sensor group. A complete set of topologies can list all of the different ways that the resources can be connected and configured within the sensor group. Some topologies may be incompatible with other topologies. For example, by selecting one topology, other topologies may be foreclosed because settings and/or configurations of the different topologies may be incompatible. Incompatibilities can be determined by using the dependencies of the processing engines to determine which resources (e.g., inputs and capabilities) are required by the processing engines. A topology can include a particular resource only when all of the resource's upstream resources are available. An upstream resource may not be available when a sensor is not installed or when an upstream sensor has been configured in an incompatible manner. Thus, the available topologies within the sensor group can change as sensors and/or processing engines are configured for use.

A topology negotiation can be used to determine which sensors and streams are available from the sensor group and which combinations of streams are operable. The topology negotiation can begin with a number of rules such as: all hardware sensors and software sensors can produce source streams; processing engines can produce one or more synthesized streams and may have one or more dependent streams; all source streams and all synthesized streams can be provided as a list of available streams to every processing engine on the system until the set of synthesized streams is complete (e.g., until no new synthesized stream is available based on the available list of processing engines). These rules are intended to be illustrative of the types of rules of the topology negotiation, and additional (or fewer) rules are possible.

Sensor groups can be dynamically discoverable based on the available hardware/software on the given system. For example, whenever a new video capture device (e.g., a camera device) or a processing engine is added or removed from a system, the available topologies can be updated and published by the sensor group. This can be done by iterating through all the available hardware/software sensors and negotiating with each component to obtain the list of available source streams.

The sensor group can publish the set of potential topologies that can be used by an application. Publishing the topologies can include providing a method or field of the sensor group accessing the topologies, writing the topologies to a data structure in memory and/or a file on a storage device. When a resource of the sensor group is configured in a controlling mode, some of the topologies may be incompatible with the configuration and the incompatible topologies can be dropped from the published set of topologies. However, when a resource of the sensor group is configured in a sharing mode, the resource can be reconfigured in a different way and so the published set of topologies may stay the same as before the configuration. In other words, the published topologies may include topologies that are incompatible with a resource configured in sharing mode because the resource can be reconfigured.

An application can have concurrent access to multiple sensor groups. For example, a different sensor group can be auto-generated for each physical container available (including the base chassis represented by the computer—e.g., laptop, desktop, and so forth) and for every concurrent camera profile defined for each of the sensors available on that physical container.

At 530, a request to configure at least one of the enumerated resources can be received. By issuing a request to the sensor group, an application can use the sensor group object to reserve streams and/or configure a topology within the sensor group. The request can include a process identifier of the requestor, an authorization token, a mode (e.g., controlling or sharing), a stream identifier, a resource identifier, a topology identifier, a container identifier, a stream type, a resource type or capability, a buffer size, or other information for selecting and/or configuring a resource of the sensor group. For example, the request can be for a specific resource or for a resource matching a set of capabilities. As a specific example, the request can be for the left camera (or a specific source stream originating from the left camera) or for any camera (or source stream) that can operate at 1080p. By identifying the left camera, only one resource can match the request. However, by identifying any camera capable of operating at 1080p, the operating system can potentially choose between multiple resources that may meet the requested capabilities.

The operating system can choose a topology or a resource that best fits an optimization criteria. For example, the OS may choose a camera that is already in operation so that a memory footprint and energy usage can be reduced compared to having two different cameras (and two different buffers) perform the same function. As another example, the OS can select a higher fidelity camera out of a group of lower fidelity cameras so that a user experience associated with the camera can potentially be enhanced. In this manner, the resources of the sensor group can be virtualized, much like virtual memory, where the OS can select a specific physical resource that matches a set of capabilities. The set of capabilities can be fully enumerated in the request to the sensor group, or the set of capabilities can be filled in or completed by the sensor group based on optimization criteria and the available resources and/or topologies.

The sensor group can also provide virtualization by combining individual components of the sensor group into a single grouping that is accessible with a single interface. Specifically, the sensor group can provide a set of valid combinations of the individual components that can be used concurrently. Thus, an application can interact with the sensor group in the same manner as it does for a single physical sensor. For example, a single physical sensor can generate multiple streams and a single sensor group can generate multiple streams. The sensor group can extend the physical sensor model by virtualizing the multiple physical cameras, processing engines and software sensors into a single virtual "device" which can produce a number of data streams based on a number and connectivity of sensors within the sensor group. As a specific example, the sensor group can include a left and a right RGB camera and a depth stream processing engine. As another specific example, a sensor group object can include a left and right RGB camera, an infrared camera, and a depth stream component.

At 540, one or more checks can be performed on the request. As one example, elements of the request can be checked to determine if the elements are compatible with the published topologies. Specifically, the request can be checked to determine if a valid mode, topology, stream, media type, sensor, or other element is requested. As another example, an authorization token of the request can be compared to a saved authorization token associated with the resource. In particular, a sensor driver and/or a service of the OS can issue tokens only to programs that are authorized to access a particular resource. The requestor can obtain the token prior to issuing the request or in response to accessing the sensor group. If any of the checks of the request fail, at 550, an error message can be sent in a response to the request. However, if the checks of the request succeed, the method 500 can continue at 560.

At 560, the resource can be configured according to the request. The configuration can be for a single resource or for multiple resources. For example, if a synthesized stream is requested to be configured, the dependencies of the processing engine generating the stream can be identified, and the dependent streams and resources can be configured accordingly. The configuration can differ based on whether the resource is already in use at the time of the request. For example, if the resource is not in use, the configuration can include changing a power state (e.g., powering up) of a sensor, starting a new process associated with the resource, updating the published topologies of the sensor group, allocating virtual and physical memory to create a data buffer, probing and locking the memory to pin it in the physical memory, writing registers of a sensor to configure and/or start a sensor, and/or responding to the request with a ready message and/or a range of virtual addresses (in the address space of the requestor) corresponding to the data buffer. If the resource is already in use, the configuration can vary based on whether the request is to use the resource in a controlling mode or a sharing mode. For example, if the request is to use the resource in a controlling mode and the configuration differs from the current configuration of the resource, then the configuration of the resource can be changed from the current configuration. As a specific example, the configuration can include resizing the data buffer by releasing existing memory or allocating additional memory (physical and virtual), probing and locking any newly allocated memory, writing registers of the sensor to reconfigure and/or restart the sensor, updating the published topologies of the sensor group, notifying other users of the resource about the reconfiguration, and/or responding to the request with a ready message and/or a range of virtual addresses (in the address space of the requestor) corresponding to the data buffer. However, if the request is to use the resource in a controlling mode and the configuration is the same as the current configuration of the resource, then the configuration of the resource can be similar to the configuration of the resource in sharing mode. For example, assigning virtual memory addresses in the requestor address space to provide access to the existing data buffer, and/or responding to the request with a ready message and/or the range of virtual addresses corresponding to the data buffer. Thus, sharing the resource amongst various processes may be more efficient compared to not sharing the resource. Specifically, the shared resource can potentially be configured using fewer CPU cycles, less memory, and less energy.

At 570, the configured resource can be used to transport data. For example, a sensor of the sensor group can generate data which can be stored in a data buffer associated with the resource. A producer process associated with the resource can monitor the data buffer and update a memory descriptor list storing pointers to valid data stored in the buffer. The valid data can be data that has been written into the buffer and not read by all of the consumer processes that have requested data from the resource. When all of the consumer processes have read the data, the storage locations can be recycled by removing the locations from the memory descriptor list. Data can be stored in the buffer using lossy or lossless methods to handle transfer rate mismatches between the producer process and the consumer process(es).

At 580, a request to stop using or tear-down the resource can be received. The request to stop can come from the producer process, a consumer process, or the OS kernel, for example. A response to the request can differ depending on a content of the request, which process initiated the request, and whether the resource is being shared. For example, the OS kernel and/or the producer process can create a request to block all or a portion of the consumer processes from accessing the resource. In this manner, the producer and/or kernel can retain command and control over the resource to potentially increase security and/or privacy of a user. The kernel and/or producer can request that a shared resource be torn-down or blocked for only a portion of the consumers (e.g., a single consumer) of the resource. Additionally, a consumer can request to stop using a shared resource. In these cases, the resource can continue operating for the portion of the consumers not being blocked. However, for the portion of consumers being blocked, the virtual memory associated with data buffer(s) for the blocked consumers can be unmapped so that future requests to the memory range can cause access violations. Alternatively, the resource can have a single consumer or it can be requested that all of the consumers of the resource be blocked. If all of the consumers of the resource are to be blocked, the resource can be stopped or torn down.

At 590, the resource can be stopped or torn down. Stopping the resource can include halting a producer process associated with the resource, halting a service associated with the resource, freeing and unlocking memory (virtual and physical) so that the memory can be reused by the OS, changing a power state of a sensor (e.g., placing a sensor in a low-power or powered-down mode), notifying consuming processes that the resource is being stopped, updating the published topologies of the sensor group, and/or responding to the request with a notification message indicating that the resource is stopping.

FIG. 6 is a flow diagram illustrating an example method 600 of allocating resources of a computing system. At 610, hardware sensors and software modules that are capable of interacting with one another can be enumerated. Enumeration can include identifying all hardware sensors with a matching container identifier. Enumeration can include identifying all hardware sensors and software modules that are registered in a database or file, such as a concurrent camera profile file. The software modules can include software sensors that can generate a source stream and processing engines that can generate a synthesized stream using an input stream. Enumeration can occur in response to an initialization sequence of the computing system, such as a boot-up sequence. Enumeration can occur in response to a sensor or processor engine being added or uninstalled.

At 620, a topology can be negotiated that is compatible with capabilities of the enumerated hardware sensors and software modules. The topology negotiation can include identifying dependent streams (and transfer rates), dependent resources, and/or dependent modes for each of the software modules. The topology negotiation can include identifying shared resources of the hardware sensors (such as a shared frame buffer for a pair of cameras). Negotiating the topology can include finding a compatible set of connections and settings of the enumerated hardware sensors and software modules so that a synthesized stream can be generated. The negotiated topology can be added to a list or data structure that is accessible to potential requestors of the enumerated hardware sensors and software modules.

At 630, a request can be received from a requestor to configure at least one of the enumerated hardware sensors and software modules. The request can be to use the at least one of the enumerated hardware sensors and software modules in a controlling mode and/or a sharing mode. For example, the request can be to use one enumerated resource in a sharing mode and one enumerated resource in a controlling mode. As a specific example, a topology can be requested where an infrared camera is requested in controlling mode and a visible spectrum camera is requested in sharing mode. As another example, the request can be for a single resource in a sharing mode. The request can be for a specific resource (e.g., a left visible spectrum camera) or for a resource having a specific capability (e.g., any visible range camera).

At 640, the at least one of the enumerated hardware sensors and software modules can be configured according to the negotiated topology in response to the received request. Configuring the at least one of the enumerated hardware sensors and software modules can include assigning a range of virtual memory addresses in the requestor's address space for a data buffer, and mapping the range of virtual memory addresses to physical memory of the computing system. The physical memory of the computing system can be selected from system memory associated with a central processing unit, graphics memory associated with a graphics processing unit, or embedded memory of the hardware sensors. Configuring the at least one of the enumerated hardware sensors and software modules can include starting a process associated with a sensor driver and allocating virtual memory in the address space for the data buffer. The physical memory for the data buffer can be shared between the sensor driver process and the requestor process so that data can be transported to the requestor without copying the data.

At 650, the at least one of the enumerated hardware sensors and software modules can be optionally shared with an additional requestor. Specifically, a data buffer can be assigned to the virtual address space of the additional requestor and the physical memory can be shared between the producer process (the process associated with the sensor driver) and the consumer or requestor processes.

FIG. 7 is a flow diagram illustrating an example method 700 of virtualizing a sensor. At 710, a set of topologies can be published. The topologies can include interoperable combinations of hardware sensors and/or software modules. Publication can include writing the topologies to a file or to a data structure stored in memory. Publication can include providing a method of a sensor group object for identifying the topologies. The topologies for publication can be determined by enumerating the resources of a sensor group and identifying compatible combinations of resources based on dependencies of the resources.

At 720, a request can be received from a consumer process to use a particular topology of the published set of topologies. The consumer process can request to use all or a portion of the resources of the particular topology in a controlling mode or a sharing mode. The request can be for a topology comprising a specific resource (e.g., a topology including a left visible spectrum camera) or for a topology comprising a resource having a specific capability (e.g., a topology including any visible range camera).

At 730, a set of virtual addresses in an address space of the consumer process can be mapped to a set of physical addresses in response to receiving the request to use the particular topology. The physical memory can be selected from system memory associated with a central processing unit, graphics memory associated with a graphics processing unit, or embedded memory of the hardware sensors. The physical memory addressed by the set of physical addresses can be used as a data buffer for communicating data from a producer process associated with a sensor or software module (e.g., a processing engine) to the consumer process. For example, the producer process and the consumer process can share the data buffer by having the physical memory of the data buffer mapped to the virtual memory of the producer process.

At 740, the set of virtual addresses in the address space of the consumer process can optionally be unmapped from the set of physical addresses in response to receiving a request from a process different from the consumer process. For example, the producer process or another process of the OS kernel can request to revoke access privileges for the consumer process of at least one of the resources of the topology. In this manner, the producer process and/or OS kernel can maintain command and control over the use of the resources and their associated data buffers. As another example, the consumer process can be using at least one of the resources in a sharing mode, and another consumer process can request to use the resource in a control mode that is incompatible with the current configuration (e.g., the transfer rate can be increased to more than the consumer process can process). Thus, the consumer process can lose access to the resource due to the reconfiguration of the resource.

Additional Examples of the Disclosed Technology

Additional examples of the disclosed subject matter are discussed herein in accordance with the examples discussed above.

In one embodiment, a method can be used to allocate resources of a computing system. The method comprises: enumerating hardware sensors and software modules that are capable of interacting with one another; negotiating a topology that is compatible with capabilities of the enumerated hardware sensors and software modules; receiving a first request from a first requestor to configure at least one of the enumerated hardware sensors and software modules; and configuring the at least one of the enumerated hardware sensors and software modules according to the negotiated topology in response to the received first request. Configuring the at least one of the enumerated hardware sensors and software modules can include locking a set of addresses in physical memory of the computing system. Computer-executable instructions for executing the method can be stored in a computer-readable memory.

Negotiating the topology can include determining dependent streams and transfer rates of the software module. Configuring the at least one of the enumerated hardware sensors and software modules can include allocating a range of virtual memory addresses in a first process address space, and mapping the range of virtual memory addresses to physical memory of the computing system. The physical memory of the computing system can be selected from system memory associated with a central processing unit, graphics memory associated with a graphics processing unit, or embedded memory of the hardware sensors.

The first request can include a request to use the at least one of the enumerated hardware sensors and software modules in a controlling mode and the topology can be updated in response to receiving the first request.

Alternatively, the first request can include a request to use the at least one of the enumerated hardware sensors and software modules in a sharing mode. In this case, the method can further include receiving a second request to configure at least one of the enumerated hardware sensors and software modules. The second request can include a request to use the at least one of the enumerated hardware sensors and software modules in a controlling mode that is incompatible with the configuration of the first request. The method can further include reconfiguring the at least one of the enumerated hardware sensors and software modules in response to the received second request. The method can further include notifying the first requestor that the at least one of the enumerated hardware sensors and software modules is being reconfigured.

In another embodiment, one or more computer-readable media can store computer-executable instructions which when executed by a computer cause the computer to perform a sensor virtualization method. The method comprises publishing a plurality of topologies including interoperable combinations of hardware sensors and/or software modules; receiving a first request from a first process to use a first topology of the published plurality of topologies; and mapping a first set of virtual addresses in an address space of the first process to a first set of physical addresses in response to receiving the first request to use the first topology. The method can further include probing and locking the first set of physical addresses in response to receiving the first request the use the first topology. The method can further include changing a power state of at least one of the hardware sensors in response to the first request.

The first set of physical addresses can correspond to embedded memory of a given hardware sensor. Alternatively, the first set of physical addresses can correspond to graphics memory in communication with a graphics processing unit. Alternatively, the first set of physical addresses can correspond to system memory in communication with a central processing unit.

The method can further include executing a producer process associated with the first topology, the first set of physical addresses also being mapped to a second set of virtual addresses in an address space of the producer process so that the first set of physical addresses are mapped to both the first set of virtual addresses and the second set of virtual addresses.

The method can further include: receiving a second request from a second process to use a second topology of the published plurality of topologies, the second topology incompatible with the first topology; unmapping the first set of virtual addresses in the address space of the first process in response to receiving the second request; and mapping a second set of virtual addresses in an address space of the second process to a second set of physical addresses in response to receiving the second request. For example, the first request can be a sharing mode request and the second request can be a controlling mode request.

In another embodiment, a computing system comprises a plurality of cameras; a system memory; and a processor in communication with the plurality of cameras and the system memory. The processor can be configured to: provide a sensor group data structure including one or more topologies that are compatible with the plurality of cameras; receive a request from a first process to configure the plurality of cameras according to one topology of the one or more topologies; cause at least one of the cameras of the plurality of cameras to be configured in response to the request; allocate virtual memory in a first address space of the process and lock physical memory corresponding to the virtual memory in the system memory; cause a client library to be loaded in the first address space of the process, the client library including functions for encapsulating communications with the at least one of the cameras; and update the sensor group data structure based on the configuration of the at least one of the cameras.

A topology of the one or more topologies can specify source streams from the plurality of the cameras, synthesized streams from software processing units of the sensor group, and compatible connections among the plurality of the cameras and the software processing units. The client library can include functions for controlling exposure and focus of the at least one of the cameras. The processor can be further configured to start a second process associated with a device driver of the at least one of the cameras in response to the request.

An Example of Kernel Memory Reflection

The sensor group can call various services or functions of the OS to perform functions associated with the sensor group. For example, the sensor group can call a kernel memory reflector service for managing actions associated with a data buffer of the sensor group. Kernel memory reflection can be used to efficiently map shared memory (such as a media frame from a camera) from a single producer to multiple consumers. Instead of the producer/consumer processes mapping the memory into their process spaces, the kernel component (herein referred to as a reflector or kernel memory reflector) can handle the mapping and lifetime of the memory. This can be accomplished by the producer process providing to the reflector a list of virtual addresses specific to the producer process along with their sizes and the list of consumer processes that may consume the data. Kernel memory reflection can be used as a basis for various producer/consumer memory virtualization schemes, such as the sensor group.

As disclosed herein, kernel memory reflection can potentially reduce or eliminate copying and enable the producer process to maintain access control. For example, instead of the producer/consumer processes mapping the memory into their process spaces, the kernel reflect component handles the mapping and lifetime of the memory. This can be accomplished by the producer process providing to the reflector a list of virtual addresses specific to the producer process along with their sizes and the list of consumer processes that may consume the data.

Since the producer provides the list of allowed consumers of the data, the reflector can use the producer-provided list to ensure any non-approved consumers are not allowed to access the reflected frames. In other words, the producer process communicates through the reflector to allocate memory that is accessible by the consumer process.

The reflector can probe/lock the physical memory pages corresponding to the virtual addresses and when one of the listed consumer process requests a "frame of data", the reflector can "reflect" that physical memory page into the address space of the consumer process. This can be done after the requesting consumer has been validated as one of the accepted consumers as determined by the producer.

The reflector can manage the life cycle of the reflected memory, keeping the memory resident until either the consumer has indicated that it is done processing the frame or the producer has indicated that access rights can be revoked. In response to one of these events, the reflector can remove the reflected memory from the consumer process address space. By following this procedure, the ownership of the physical memory and the corresponding "reflections" of that memory into various consumer process address spaces can remain with the reflector.

Furthermore, since the reflector can work on any virtual address provided by the producer process, there is no requirement of using a section object or any specific memory type. Thus, any memory that is backed by system RAM can potentially be reflected in this manner.

The reflector can be extended to further handle non-system RAM provided there is a mechanism to marshal non-system RAM memory across process boundaries (such as NT HANDLE duplication).

An Example Method of Using Kernel Memory Reflection

An example method of using kernel memory reflection can begin with a consumer process requesting access to an output of a producer process. The producer process can idle or running at the time of the request. For example, the producer process can be started, woken up, or queried in response to a request by the consumer process. The request can include a type of access requested (e.g., read-only or read-write), credentials associated with the consumer process, a buffer size, and/or a range of virtual addresses within the producer process address space. When the producer process is idle or asleep, memory associated with an output buffer of the producer process can be freed so that other applications can use the memory.

The producer process can determine whether to give the consumer process access to the producer data and what type of access to give. For example, an access control list can be retrieved, and the consumer process can be granted access to producer data if the consumer process or a user associated with the consumer process has permission to use the producer process. As another example, properties within the request can be analyzed and the consumer process can be granted access to producer data if the requested properties match capabilities of the producer process. In particular, if the consumer process requests an unsupported bit-rate or data type, the request can be denied.

The producer process can allocate memory for an output buffer of the producer process using a heap allocator (such as a "malloc" or a "new"), allocation from a memory pool, or other allocation process. Heap allocation may provide for allocation of memory blocks of varying sizes, and memory pool allocation may provide for allocation of memory blocks having fixed sizes. By allocating memory for the output buffer, a range of virtual addresses within the address space of the producer process is associated with the output buffer. The virtual addresses of the output buffer can be mapped to physical addresses as part of the allocation process or at a later time. Alternatively, the producer process can use the same memory for the output buffer that was allocated earlier. For example, memory can be allocated when a first consumer process requests data generated by the producer process, and all or a portion of the same memory can be used when a second consumer process requests data generated by the producer process.

The producer process can configure the transport mechanism to the consumer process via the reflector. For example, if the producer process determines it will give the consumer process access to the producer data, a message or request can be sent from the producer process to the reflector of the OS kernel. The message can include a reference to the approved consumer (such as a process identifier) and a level of access to be given to the approved consumer (such as read-only or read-write). The reflector can track or register the approved consumer process in association with the producer process. The message can include a buffer size, a type of memory (e.g., heap or pool), a starting virtual address for the buffer, and/or a range of virtual addresses within the producer process memory range. The producer process can decide what level of access a consumer process will receive. For example, the producer process can grant read-only access or write access to individual consumer processes. As a specific example, for a given output buffer, a given producer process can grant read-only access to one consumer and read-write access to a different consumer.

The reflector can pin or lock the virtual memory addresses corresponding to the output buffer of the producer process to physical memory pages. By locking the physical memory pages, the reflector can prevent the memory pages from being paged out of physical memory, potentially enabling lower latency access to the pages. The reflector can maintain a quota system so that an application cannot exceed a threshold amount of physical memory. The threshold amount can be selected so that a given application cannot starve out other applications that may also request memory resources. The reflector can maintain or update a memory descriptor list that maps the virtual memory addresses to the physical memory addresses. The physical memory addresses can be contiguous or non-contiguous. The reflector can lock the entire address range for the output buffer into physical memory during initialization of the buffer and keep the memory locked for a lifetime of the buffer. Additionally or alternatively, the reflector can dynamically lock physical addresses as a producer writes into the output buffer and free up physical addresses as all consumer(s) read from the output buffer. For example, in the case of a given video frame, the physical memory corresponding to the given video frame can be locked when the video frame is written into the output buffer, and the physical memory can released when the video frame is read from the output buffer.

As the producer process generates data, the data can be written into the output buffer. Examples of data can include frame buffer data from a video or still camera, audio data from a microphone, streaming data from a hardware or software resource, and so forth. The data can be transferred through the buffer using a lossless or a lossy approach. As one example, the data can be transferred through the buffer using a lossless first-in, first-out approach. In this approach, the buffer will stall (e.g., no new data can be stored in the buffer) when the buffer is full, such as when the consumer is not reading the data as fast as the producer is putting data in the buffer. The first-in, first-out approach can be adjusted based on data transfer rates of the producer and the consumer. For example, the oldest data stored in the buffer can be read or overwritten from the buffer first. If the amount of data stored in the buffer reaches a quota or the buffer becomes full and the producer has more data to store in the buffer, the producer can overwrite the oldest data with the new data. This may occur when the producer is writing data to the buffer faster than the consumer is reading data from the buffer. By overwriting the oldest data in the buffer, the oldest data will be lost. In other words, the data can be aged and the oldest data can be removed first, whether it is read by the consumer or overwritten by the producer. A lossy buffer may be desirable in real-time streaming, such as when video frames are being streamed from a camera.

Handshaking between the producer and consumer can be managed by the reflector using a push and/or a pull model. For example, the producer can send a message to the reflector indicating that a chunk of data has been written to the output buffer and is ready to be consumed. The reflector can push or send a message to the consumer indicating that new data is available in the output buffer. The message can be sent to multiple consumers of the data. A consumer can indicate to the reflector when the data is read from the buffer. When all consumers have read a particular chunk of data from the buffer, the memory corresponding to the chunk can be overwritten. The push model may better mimic driver behavior. A pull model can also be used where the consumer requests data from the reflector when the consumer is ready to read the data. If the reflector has no data in the buffer, it can respond to the consumer with a message indicating there is no data. In one implementation, a push model can be used as a default mode of transport and a pull model can be used in a fall-back mode. For example, the push model can be used until an output buffer becomes full or contains a threshold amount of data. When the buffer is full, it can indicate that the consumer is not currently able to process the data at the rate that the producer is adding information to the buffer. When the buffer is full, the mode of transport can switch to the pull model, where the consumer informs the reflector that it is ready to read data from the buffer. The buffer can be drained in this manner until the amount of data falls below a threshold amount or the buffer becomes empty. The mode of transport can then return to the push model.

The producer process can maintain command and control over the reflected memory. For example, the producer process can revoke access to the consumer process at any time. The producer can have the memory deallocated by sending the reflector a message with a request to deallocate the memory. The reflector can send a message to any registered consumers of the output buffer that the memory has been deallocated. Thus, the consumers can take action to prevent reading data from an invalid pointer. Alternatively, the memory can be deallocated by the reflector when all consumers of the data indicate they are done processing the data. The deallocated memory can be reused by the kernel or other processes.

By allowing the producer process to maintain command and control over the reflected memory, some of the pitfalls of co-owned shared memory can potentially be avoided. For example, co-owned shared memory can be owned by both the consumer and the producer of the data. Thus, the consumer can have read/write access to the data and the consumer can potentially corrupt the data. A memory manager will also recognize that the consumer co-owns the shared memory, so even if the producer attempts to deallocate the memory, the memory cannot be deallocated so long as the consumer is a joint owner. For example, a garbage collector can be prevented from reusing the memory while the consumer has a handle or pointer into the shared memory space. Thus, a memory leak can be created and the memory resources of the computer can be poorly utilized which may prevent some services from working properly due to insufficient memory. Furthermore, the memory leak is of a shared service which can potentially create privacy issues between the different processes.

Additional Reflection Examples

An example computing system can include a camera that is being used by multiple applications. The computing system can include a pair of applications, such as a login program for logging into a computer using a fingerprint or facial recognition and a video conferencing application. The system can include an RGB camera and an IR camera. For the login program, the IR camera can be used for recognition and the RGB camera can be used for anti-spoofing. The IR camera can be in a controlling mode and the RGB camera can be in a sharing mode. For the video conferencing application, the RGB camera can be in a controlling mode and the IR camera in a sharing mode. For example, the RGB image can be the primary image of the video and the IR data can be used for blurring and/or focusing the RGB images. A typical OS that only allows a single consumer per hardware device would require two sets of RGB and IR cameras for both applications to run simultaneously. Using Kernel reflection, the cameras (or a software module of the cameras) can enable multiple consumers to use the camera data and can control which applications have which type of access. For example, the producer process corresponding to the RGB camera can grant one type of access to the login application and a different type of access to the video conferencing application. Similarly, the producer process corresponding to the IR camera can grant one type of access to the login application and a different type of access to the video conferencing application.

Example Computing Environment

Figure 8:
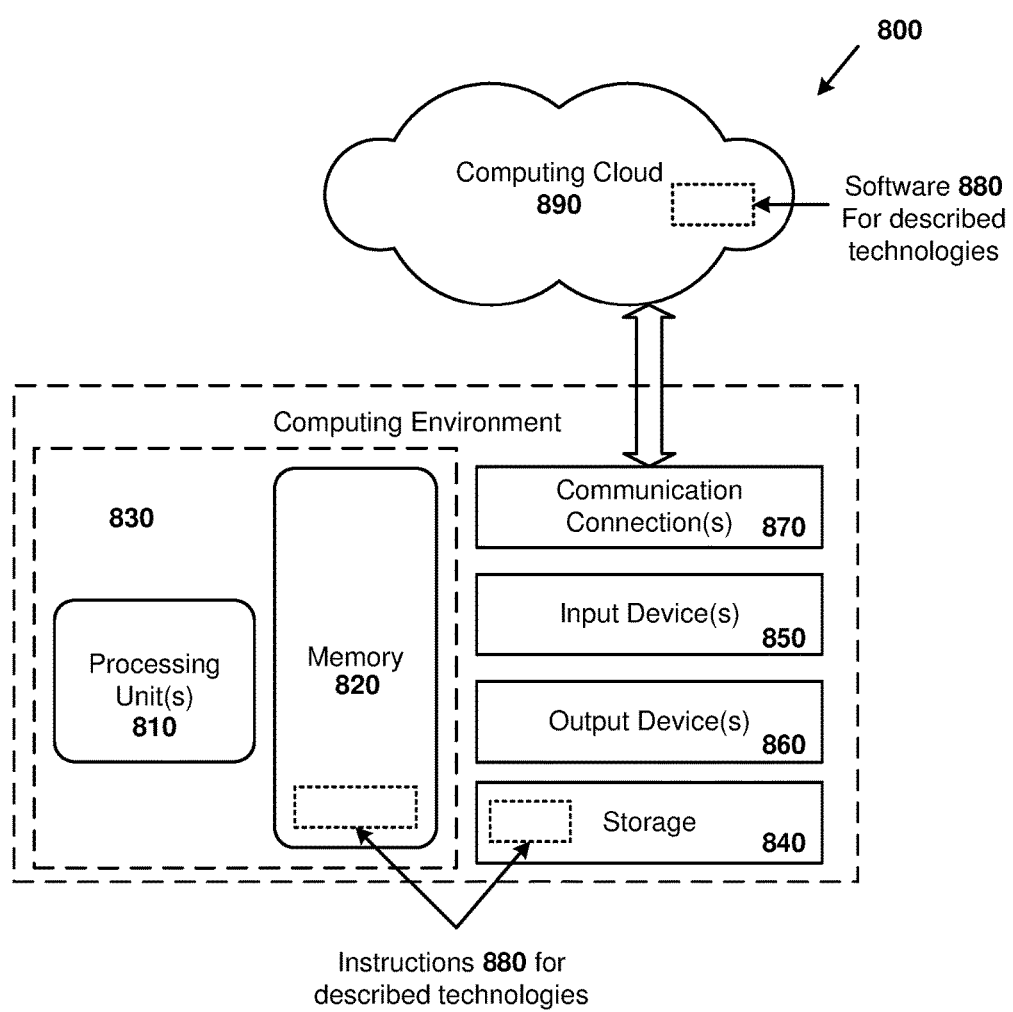
FIG. 8 is a block diagram illustrating a suitable computing environment for implementing some embodiments of the disclosed technology.

FIG. 8 illustrates a generalized example of a suitable computing environment 800 in which described embodiments, techniques, and technologies, including supporting sensor virtualization, can be implemented.

The computing environment 800 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules (including executable instructions for block-based instruction blocks) may be located in both local and remote memory storage devices.

With reference to FIG. 8, the computing environment 800 includes at least one block-based processing unit 810 and memory 820. In FIG. 8, this most basic configuration 830 is included within a dashed line. The block-based processing unit 810 executes computer-executable instructions and may be a real or a virtual processor. In a multi-processing system, multiple processing units execute computer-executable instructions to increase processing power and as such, multiple processors can be running simultaneously. The memory 820 may be volatile memory (e.g., registers, cache, RAM), non-volatile memory (e.g., ROM, EEPROM, flash memory, etc.), or some combination of the two. The memory 820 stores software 880, images, and video that can, for example, implement the technologies described herein. A computing environment may have additional features. For example, the computing environment 800 includes storage 840, one or more input devices 850, one or more output devices 860, and one or more communication connections 870. An interconnection mechanism (not shown) such as a bus, a controller, or a network, interconnects the components of the computing environment 800. Typically, operating system software (not shown) provides an operating environment for other software executing in the computing environment 800, and coordinates activities of the components of the computing environment 800.

The storage 840 may be removable or non-removable, and includes magnetic disks, magnetic tapes or cassettes, CD-ROMs, CD-RWs, DVDs, or any other medium which can be used to store information and that can be accessed within the computing environment 800. The storage 840 stores instructions for the software 880, plugin data, and messages, which can be used to implement technologies described herein.

The input device(s) 850 may be a touch input device, such as a keyboard, keypad, mouse, touch screen display, pen, or trackball, a voice input device, a scanning device, or another device, that provides input to the computing environment 800. For audio, the input device(s) 850 may be a sound card or similar device that accepts audio input in analog or digital form, or a CD-ROM reader that provides audio samples to the computing environment 800. The output device(s) 860 may be a display, printer, speaker, CD-writer, or another device that provides output from the computing environment 800.

The communication connection(s) 870 enable communication over a communication medium (e.g., a connecting network) to another computing entity. The communication medium conveys information such as computer-executable instructions, compressed graphics information, video, or other data in a modulated data signal. The communication connection(s) 870 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 890. For example, disclosed compilers and/or block-based-processor servers are located in the computing environment 830, or the disclosed compilers can be executed on servers located in the computing cloud 890. In some examples, the disclosed compilers execute on traditional central processing units (e.g., RISC or CISC processors).

Computer-readable media are any available media that can be accessed within a computing environment 800. By way of example, and not limitation, with the computing environment 800, computer-readable media include memory 820 and/or storage 840. As should be readily understood, the term computer-readable storage media includes the media for data storage such as memory 820 and storage 840, and not transmission media such as modulated data signals.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:

1. One or more computer-readable storage media storing computer-executable instructions, which when executed by a computer, cause the computer to perform a sensor virtualization method, the method comprising:

generating a plurality of topologies in a data structure stored on the one or more computer-readable storage media, the plurality of topologies including different ways to configure and connect hardware sensors, software modules, or both hardware sensors and software modules that are installed on the computer, a respective topology representing a particular configuration and connection of the hardware sensors, the software modules, or both the hardware sensors and the software modules, wherein at least one of the hardware sensors or software modules is shareable among different processes executing on the computer;

receiving a first request from a first process executing on the computer, the first request requesting to configure and connect the hardware sensors, the software modules, or both the hardware sensors and the software modules according to a first topology of the generated plurality of topologies;

granting the first request;

in response to granting the first request, configuring and connecting the hardware sensors, the software modules, or both the hardware sensors and the software modules according to the first topology;

updating the data structure in response to granting the first request to represent which topologies of the plurality of topologies are to remain available to be used by subsequent requests after the first request is granted; and mapping a first set of virtual memory addresses in an a virtual memory address space of the first process to a first set of physical memory addresses of the computer in response to receiving the first request to use the first topology.

2. The one or more computer-readable storage media of claim 1, wherein the method further comprises:

probing and locking physical memory addressed by the first set of physical memory addresses in response to receiving the first request to configure and connect the hardware sensors, the software modules, or both the hardware sensors and the software modules according to the first topology.

3. The one or more computer-readable storage media of claim 1, wherein the first set of physical memory addresses include memory addresses of embedded memory of a given hardware sensor installed on the computer.

4. The one or more computer-readable storage media of claim 1, wherein the first set of physical memory addresses include memory addresses of graphics memory in communication with a graphics processing unit installed on the computer.

5. The one or more computer-readable storage media of claim 1, wherein the first process is a producer process, and executing the first process comprises using the hardware sensors, the software modules, or both the hardware sensors and the software modules according to the first topology to generate data to store in physical memory addressed by the first set of physical memory addresses.

6. The one or more computer-readable storage media of claim 5, wherein the first set of physical memory addresses is mapped to multiple sets of virtual memory addresses in a virtual memory address space of the producer process.

7. The one or more computer-readable storage media of claim 1, wherein the method further comprises:
receiving a second request from a second process executing on the computer, the second request requesting to use a second topology of the generated plurality of topologies, the second topology being incompatible with the first topology;
unmapping the first set of virtual memory addresses in the virtual memory address space of the first process in response to receiving the second request; and
mapping a second set of virtual memory addresses in a virtual memory address space of the second process to a second set of physical memory addresses of the computer in response to receiving the second request.

8. The one or more computer-readable storage media of claim 7, wherein the first request is a sharing mode request and the second request is a controlling mode request, wherein the controlling mode gives the requesting process exclusive control of the hardware sensors, the software modules, or both the hardware sensors and the software modules of the first topology, and the sharing mode allows other processes to take control of the hardware sensors, the software modules, or both the hardware sensors and the software modules of the first topology.

9. The one or more computer-readable storage media of claim 7, wherein the method further comprises: in response to the first request, changing a power state of a hardware sensor installed on the computer.

10. A method comprising:
generating a data structure comprising a plurality of topologies, the plurality of topologies including different ways to configure and connect hardware sensors and software modules that are installed on a computer, a respective topology representing a particular configuration and connection of the hardware sensors and the software modules, wherein at least one of the hardware sensors or software modules is shareable among different processes executing on the computer;
receiving a first request from a first process executing on the computer, the first request requesting to configure and connect the hardware sensors and the software modules according to a first topology of the generated plurality of topologies;
granting the first request;
in response to granting the first request, configuring and connecting the hardware sensors and the software modules according to the first topology; and
updating the data structure in response to granting the first request to represent which topologies of the plurality of topologies are to remain available to be used by subsequent requests after the first request is granted.

11. The method of claim 10, wherein the method further comprises:
mapping a first set of virtual memory addresses in a virtual memory address space of the first process to a first set of physical memory addresses of the computer in response to receiving the first request to use the first topology.

12. The method of claim 11, wherein the method further comprises:
probing and locking physical memory addressed by the first set of physical memory addresses in response to receiving the first request to configure and connect the hardware sensors and the software modules according to the first topology.

13. The method of claim 11, wherein the first set of physical memory addresses include memory addresses of embedded memory of a given hardware sensor installed on the computer.

14. The method of claim 11, wherein the first set of physical memory addresses include memory addresses of graphics memory in communication with a graphics processing unit installed on the computer.

15. The method of claim 11, wherein executing the first process comprises using the hardware sensors and the software modules according to the first topology to generate data to store in physical memory addressed by the first set of physical memory addresses.

16. The method of claim 11, wherein the method further comprises:
receiving a second request from a second process executing on the computer, the second request requesting to use a second topology of the generated plurality of topologies, the second topology being incompatible with the first topology;
unmapping the first set of virtual memory addresses in the virtual memory address space of the first process in response to receiving the second request; and
mapping a second set of virtual memory addresses in a virtual memory address space of the second process to a second set of physical memory addresses of the computer in response to receiving the second request.

17. The method of claim 16, wherein the first request is a sharing mode request and the second request is a controlling mode request, wherein the controlling mode gives the requesting process exclusive control of the hardware sensors and the software modules of the first topology, and the sharing mode allows other processes to take control of the hardware sensors and the software modules of the first topology.

18. An apparatus comprising:
a plurality of hardware sensors;
a processor in communication with the plurality of hardware sensors; and
a computer-readable storage media in communication with the processor and the plurality of hardware sensors, the computer-readable storage media storing:

a data buffer;

a sensor group data structure; and computer-executable instructions, which when executed by the processor, cause the processor to perform a method comprising:

storing a plurality of topologies in the sensor group data structure, the plurality of topologies including different ways to configure and connect the plurality of hardware sensors to software modules that are executable by the processor, a respective topology representing a particular configuration and connection of the hardware sensors and the software modules, wherein at least one of the hardware sensors is shareable among different processes executing on the processor;

receiving a request, from a process executing on the processor, to configure and connect a particular hardware sensor of the plurality of hardware sensors to a particular software module of the software modules according to a particular topology of the stored plurality of topologies;

granting the request and configuring and connecting the particular hardware sensor to the particular software module according to the particular topology;

updating the sensor group data structure in response to granting the request to represent which topologies of the plurality of topologies are to remain available to be used by subsequent requests after the request is granted; and mapping a set of virtual memory addresses in a virtual memory address space of the process executing on the processor to a first set of physical memory addresses mapped to the data buffer in response to receiving the request to use the particular topology.

19. The apparatus of claim 18, wherein the request is a controlling mode request that gives the requesting process exclusive control of the hardware sensor and the software module in response to the request being granted.

20. The apparatus of claim 19, wherein topologies incompatible with the particular topology are marked as unavailable within the plurality of topologies in response to the request being granted.

\* \* \* \* \*